US011507162B2

(12) United States Patent
Ohtake et al.

(10) Patent No.: US 11,507,162 B2
(45) Date of Patent: Nov. 22, 2022

(54) INFORMATION PROCESSING APPARATUS, CONTROL METHOD OF INFORMATION PROCESSING APPARATUS, AND PROGRAM USING POWER FROM AN EXTERNAL DEVICE

(71) Applicant: BROTHER KOGYO KABUSHIKI KAISHA, Nagoya (JP)

(72) Inventors: Masaki Ohtake, Handa (JP); Hajime Usami, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 80 days.

(21) Appl. No.: 16/775,345

(22) Filed: Jan. 29, 2020

(65) Prior Publication Data
US 2020/0241618 A1    Jul. 30, 2020

(30) Foreign Application Priority Data
Jan. 30, 2019    (JP) .............................. JP2019-014191

(51) Int. Cl.
G06F 1/26    (2006.01)
G06F 3/12    (2006.01)
H02J 50/40    (2016.01)
H02J 50/12    (2016.01)
H02J 50/80    (2016.01)

(52) U.S. Cl.
CPC ............. *G06F 1/266* (2013.01); *G06F 1/263* (2013.01); *G06F 3/1204* (2013.01); *H02J 50/12* (2016.02); *H02J 50/40* (2016.02); *H02J 50/80* (2016.02)

(58) Field of Classification Search
None
See application file for complete search history.

(56) References Cited

U.S. PATENT DOCUMENTS

| | | | |
|---|---|---|---|
| 2015/0264208 A1* | 9/2015 | Achiwa | G06F 1/266 358/1.15 |
| 2017/0293335 A1* | 10/2017 | Dunstan | H02J 7/00 |
| 2017/0368853 A1* | 12/2017 | Satake | H01M 10/44 |
| 2018/0181177 A1* | 6/2018 | Fukute | H04N 1/00907 |
| 2018/0284866 A1* | 10/2018 | Sakai | H04N 1/00885 |
| 2018/0285038 A1* | 10/2018 | Shimamura | H04L 12/40045 |

(Continued)

FOREIGN PATENT DOCUMENTS

| | | |
|---|---|---|
| JP | 2015-174375 A | 10/2015 |
| JP | 2017-226130 A | 12/2017 |
| JP | 2019-097107 A | 6/2019 |

OTHER PUBLICATIONS

Official Action dated Oct. 11, 2022 received from the Japanese Patent Office in related application 2019-014191 together with English translation.

*Primary Examiner* — Danny Chan
(74) *Attorney, Agent, or Firm* — Scully, Scott, Murphy & Presser, PC

(57) ABSTRACT

An information processing apparatus includes a first communication interface for receiving a job, a second communication interface for delivering electric power, a processing unit that performing processing related to the job, and a controller that is configured to, in response to receiving the job received from an external device via the first communication interface, transmits a power request to the external device via the second communication interface.

20 Claims, 8 Drawing Sheets

(56) References Cited

U.S. PATENT DOCUMENTS

| | | | |
|---|---|---|---|
| 2019/0196565 A1* | 6/2019 | Shimamura | G06F 1/3284 |
| 2019/0238705 A1* | 8/2019 | Shimamura | G06F 1/28 |
| 2019/0238706 A1* | 8/2019 | Sakai | G06F 1/28 |
| 2019/0286204 A1* | 9/2019 | Kimura | G06F 1/266 |
| 2020/0209933 A1* | 7/2020 | Shimamura | G06F 1/263 |
| 2020/0213465 A1* | 7/2020 | Shimamura | H04N 1/00907 |

* cited by examiner

REFERENCE DATA

| TYPE OF PRINTING | POWER CONSUMPTION |
|---|---|
| MONOCHROME PRINTING | POWER CONSUMPTION PER SHEET × NUMBER OF SHEETS TO BE PRINTED |
| COLOR PRINTING | POWER CONSUMPTION MONOCHROME PRINTING × 4 |
| HIGH-RESOLUTION PRINTING | POWER CONSUMPTION MONOCHROME PRINTING × 2 |

INFORMATION PROCESSING APPARATUS, CONTROL METHOD OF INFORMATION PROCESSING APPARATUS, AND PROGRAM USING POWER FROM AN EXTERNAL DEVICE

CROSS REFERENCE TO RELATED APPLICATIONS

This application is based on Japanese Patent Applications No. 2019014191 filed on Jan. 30, 2019, the entire contents of which are incorporated herein by reference.

TECHNICAL FIELD

The present disclosure relates to an information processing apparatus that receives a job and delivers electric power, a control method for the information processing apparatus, and a program.

BACKGROUND

In the related art, for example, there is a printing apparatus that exchanges power with an external device by a method according to the USB power delivery (PD) standard. The printing apparatus disclosed in JP-A-2017-226130 supplies power from a USB interface to a smart device such as a smartphone. The printing apparatus receives a print job from the smart device while supplying power and executes the received print job by a printing unit.

In order to execute a print job in the printing unit, a certain amount of power is required. On the other hand, for example, in a situation where the power of the printing apparatus is limited such as battery driving, if there is not enough power left to execute the received print job, the print job may not be executed properly.

The present application has been proposed in view of the above-described problems, and an object thereof is to provide an information processing apparatus, a control method of the information processing apparatus, and a program that is configured to process a job while securing power when a job is received.

SUMMARY

According to an aspect of the present invention, an information processing apparatus includes a first communication interface for receiving a job, a second communication interface for delivering electric power, a processing unit that performs processing related to the job, and a controller that is configured to, in response to receiving the job received from an external device via the first communication interface, transmit a power request to the external device via the second communication interface.

In addition, a contents of the present disclosure is implementable not only as an information processing apparatus, but also as a control method for controlling the information processing apparatus, and a program executing by a computer controlling the information processing apparatus.

According to the information processing apparatus and the like according to the present application, when a controller receives a job from an external device via a first communication interface, the controller transmits a power request to the external device that has transmitted the job. Thus, when a job is received, the job can be processed by receiving necessary power from the external device that is a transmission source and securing the power.

DESCRIPTION OF EMBODIMENTS

Hereinafter, a portable printer 1 as an embodiment embodying an information processing apparatus of the present application will be described with reference to FIG. 1.

(1. Configuration of Portable Printer)

Figure 1:
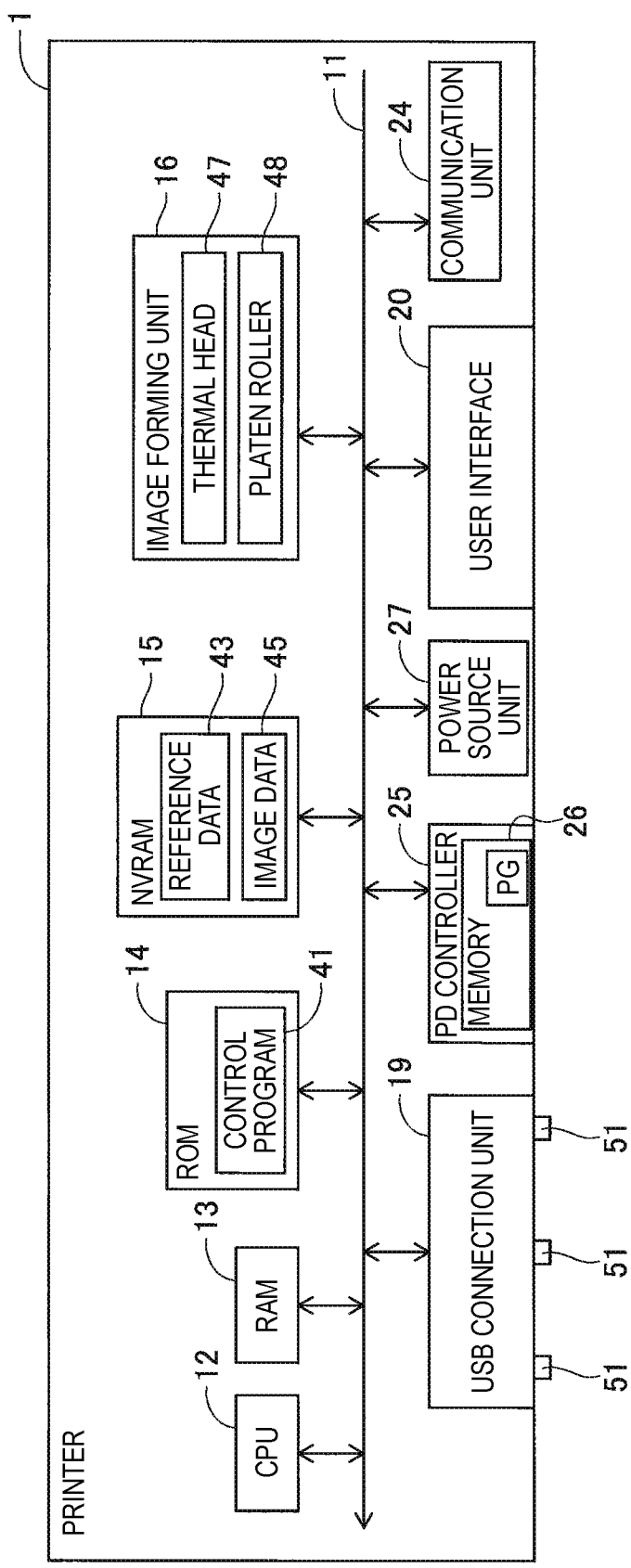
FIG. 1 is a block diagram of a printer according to an embodiment.

FIG. 1 illustrates an electrical configuration of a portable printer 1 of the present embodiment. For example, the printer 1 is a portable printing apparatus that prints image data of a print job received via wired communication or wireless communication with a PC or a smartphone on a predetermined sheet (such as thermal paper). The printer 1 includes a CPU 12, a RAM 13, a ROM 14, an NVRAM 15, an image forming unit 16, a USB connection unit 19, a user interface 20, a communication interface 24, a PD controller 25, a power source unit 27, and the like. These CPU 12 and the like are connected to each other via a bus 11.

The ROM 14 is a nonvolatile memory such as a flash memory, for example and stores various programs such as a control program 41. For example, the CPU 12 executes the control program 41 read from the ROM 14 and activates the system of the printer 1. The NVRAM 15 is a nonvolatile memory. The NVRAM 15 stores reference data 43 and image data 45. The data storage destination described above is an example. For example, the control program 41 may be stored in the NVRAM 15. The reference data 43 may be stored in the ROM 14. A storage unit for storing the control program 41 is not limited to the ROM and may be a flash memory. The storage unit that stores the control program 41 may be a computer-readable storage medium. As a computer-readable storage medium, a recording medium such as a CD-ROM or DVD-ROM may be employed in addition to the above example.

The control program 41 is, for example, firmware that comprehensively controls each unit of the printer 1. The CPU 12 executes the control program 41 and controls each unit connected via the bus 11 while temporarily storing the executed processing result in the RAM 13. As will be described later, the reference data 43 is data that is referred to when calculating power consumption (an example of an amount of execution power) required to execute a print job. The image data 45 is, for example, image data of a print job received via wired communication or wireless communication with a PC, a smartphone, or the like.

The image forming unit 16 includes, for example, a line-type thermal head 47 and prints an image on a sheet by a direct thermal method based on the control of the CPU 12. The image forming unit 16 rotates a platen roller 48 provided to face the thermal head 47 and conveys the sheet. For example, when a sheet is inserted into the insertion port of the printer 1 at the start of printing, the inserted sheet is guided to the opposed portion of the platen roller 48 and the thermal head 47 and is discharged from the discharge port after printing is completed.

The USB connection unit 19 is an interface that performs communication and power delivering in conformity with, for example, the USB PD standard. The USB connection unit 19 includes, for example, three receptacles 51 as connectors. The USB connection unit 19 performs data communication and power delivering with various external devices connected to the receptacle 51. As an external device to be connected, for example, various devices that is configured to be connected with the USB standard such as a notebook computer, a personal computer, a smartphone, an external hard disk, a USB memory, and a card reader may be adopted.

Figure 2:
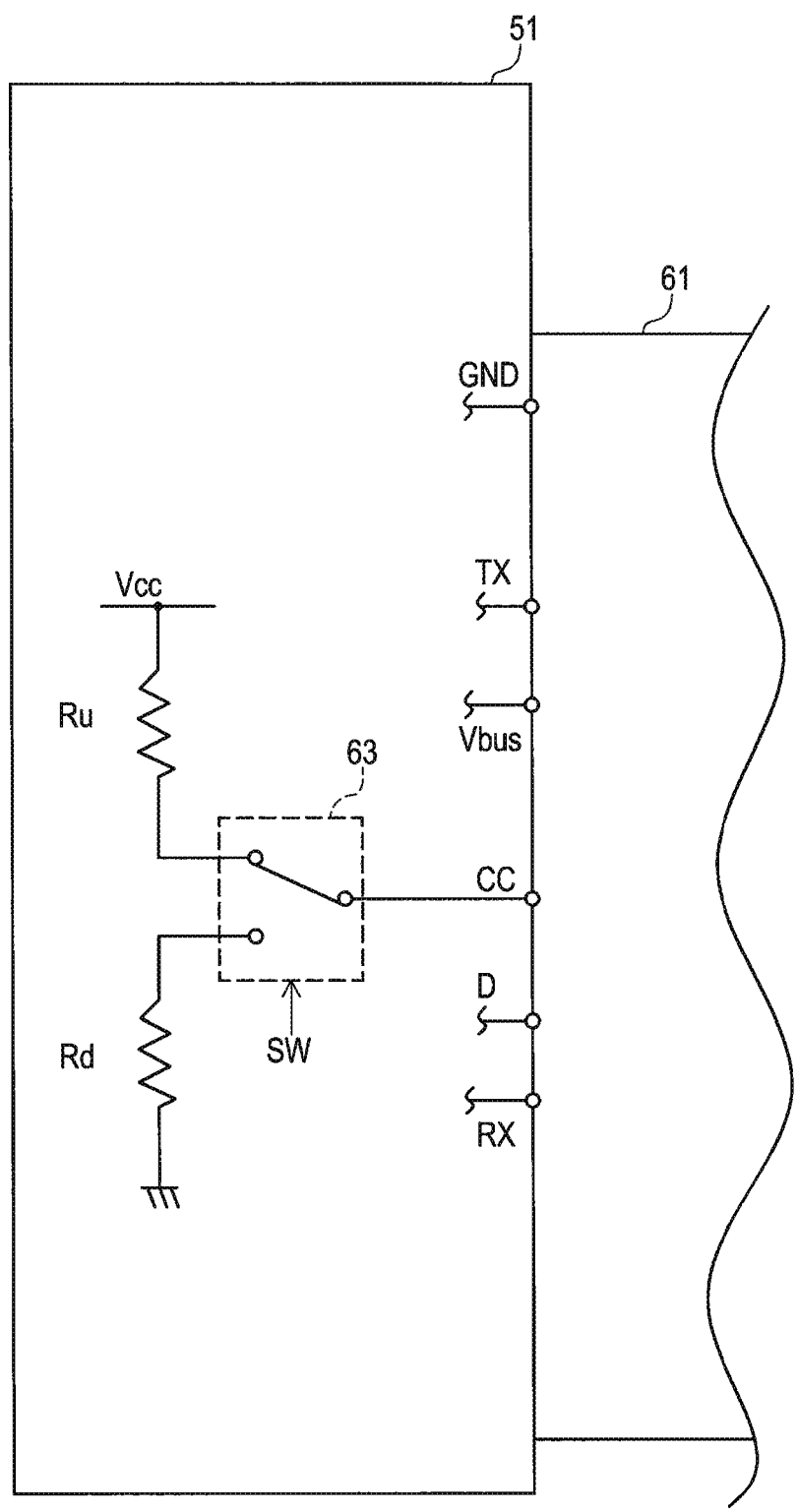
FIG. 2 is a diagram illustrating a configuration of a receptacle 51.

The receptacle 51 is, for example, a connector that conforms to the USB Type-C standard. Each receptacle 51 includes a plurality of pins for performing data communication and power delivering. For example, the receptacle 51 is a USB Type-C standard connector and has twenty-four pieces of pins. The twenty-four pins are a GND pin, a TX pin, an RX pin, a D pin, a Vbus pin, a CC pin, and the like. The twenty-four pins may also be referred to as twenty-four signal lines. FIG. 2 illustrates a configuration of the receptacle 51 and shows one pin of the same type. The receptacle 51 is provided with pins of the same type at positions where the connectors are rotationally symmetric and configured to correspond to the direction (front and back) of a plug 61 of the USB cable connected to the receptacle 51.

The TX pin, the RX pin, and the D pin are pins that perform data communication, for example. The D pin is, for example, a Data pin and indicates D+/D−. The receptacle 51 can receive print job data from an external device by data communication using the TX pin and RX pin or data communication using the D pin. Accordingly, the TX pin, the RX pin, and the D pin are examples of the first communication interface and a first communication line of the present disclosure. The Vbus pin is a pin that supplies power or receives power. The receptacle 51 is configured to exchange power with an external device via the Vbus pin.

The CC pin is a pin used in order to determine an electric power role, for example. Each receptacle 51 has a dual role power (DRP) function that is configured to be switched to a power source that has a power role supplying power or a power sink that has a power role receiving power.

The PD controller 25 controls transmission/reception of power and transmission/reception of data via the USB connection unit 19. The PD controller 25 determines the power role based on the connection state of the CC pin when an external device is connected to each receptacle 51 and executes a negotiation for power delivering by using the TX pin, the RX pin, and the D pin. Accordingly, the TX pin, the RX pin, the D pin, and the CC pin are examples of a second communication interface and a second communication line. The negotiation here is, for example, processing for setting a power role, setting a power amount to be delivered, and the like. The CC pin has, for example, a CC1 pin and a CC2 pin corresponding to the front and back of the plug 61, and one is used as a configuration channel (CC) and the other is used for VCONN transmission depending on the front and back of the plug 61 of the connected USB cable.

As illustrated in FIG. 2, the CC pin may be connected to a pull-up resistor Ru via a switch 63. The CC pin may be connected to a pull-down resistor Rd via the switch 63. The pull-up resistor Ru has one terminal connected to the switch 63 and the other terminal connected to a power supply Vcc. The power supply Vcc supplies a predetermined voltage (for example, 5 V). The pull-down resistor Rd has one terminal connected to the switch 63 and the other terminal connected to the ground.

The switch 63 switches connection based on a switching signal SW supplied from a switch controller (not illustrated). The switch 63 switches between a state in which the CC pin and the pull-up resistor Ru are connected (pull-up state) and a state in which the CC pin and the pull-down resistor Rd are connected (pull-down state). For example, when an external device is connected to the receptacle 51, if the PD controller 25 detects that the potential of the CC pin (pin that functions as CC among CC1 and CC2) is a potential in a pull-up state, the power controller 25 causes the receptacle 51 to function as a power source. The PD controller 25 uses the D pin or the like to negotiate for setting the amount of power to be supplied with respect to the supply of power via the Vbus pin of the receptacle 51. Similarly, when an external device is connected to the receptacle 51, the PD controller 25, when detecting that the potential of the CC pin is a pull-down potential, causes the receptacle 51 to function as a power sink. The PD controller 25 executes a negotiation for receiving power via the receptacle 51 by using the D pin or the like.

As described above, the receptacle 51 is configured to cause each receptacle 51 to function as both a power host and a power sink by periodically switching the switch 63. The PD controller 25 deter mines a power role based on the potential of the CC pin when connected. Therefore, in the printer 1 of the present embodiment, the power role of each receptacle 51 is determined at random in an initial state where an external device is connected.

As illustrated in FIG. 1, the PD controller 25 includes a memory 26. The memory 26 stores a program PG. The PD controller 25 includes a processing circuit such as a CPU and executes control of the power source unit 27 and the like by executing the program PG in the processing circuit. The memory 26 is configured by combining, for example, RAM, ROM, flash memory, and the like.

The power source unit 27 functions as a power source for each device in the printer 1 and supplies power to each device. The power source unit 27 generates power to be supplied via the USB connection unit 19. The power source unit 27 performs charging of a battery 75 (see FIG. 3) by using the power received via the USB connection unit 19. The detailed configuration of the power source unit 27 will be described later.

The user interface 20 is, for example, a touch panel and includes a liquid crystal panel, a light source such as an LED that emits light from the back side of the liquid crystal panel, a contact sensing film bonded to the surface of the liquid crystal panel, and the like. The user interface 20 receives an operation on the printer 1 and outputs a signal corresponding to the operation input to the CPU 12. The user interface 20 displays information related to the printer 1. The user interface 20 changes the display content of the liquid crystal panel based on the control of the CPU 12.

The communication interface 24 may perform wired communication and/or wireless communication. The printer 1 accepts a print job from the communication interface 24 via a wired LAN or wireless communication. The CPU 12 controls the communication interface 24 and receives a print job (such as image data 45) via wired communication or wireless communication. The printer 1 is configured to receive a print job through data communication of the USB connection unit 19. The CPU 12 executes printing by the image forming unit 16 based on the received print job.

(2. Configuration of Power Source Unit 27)

Figure 3:
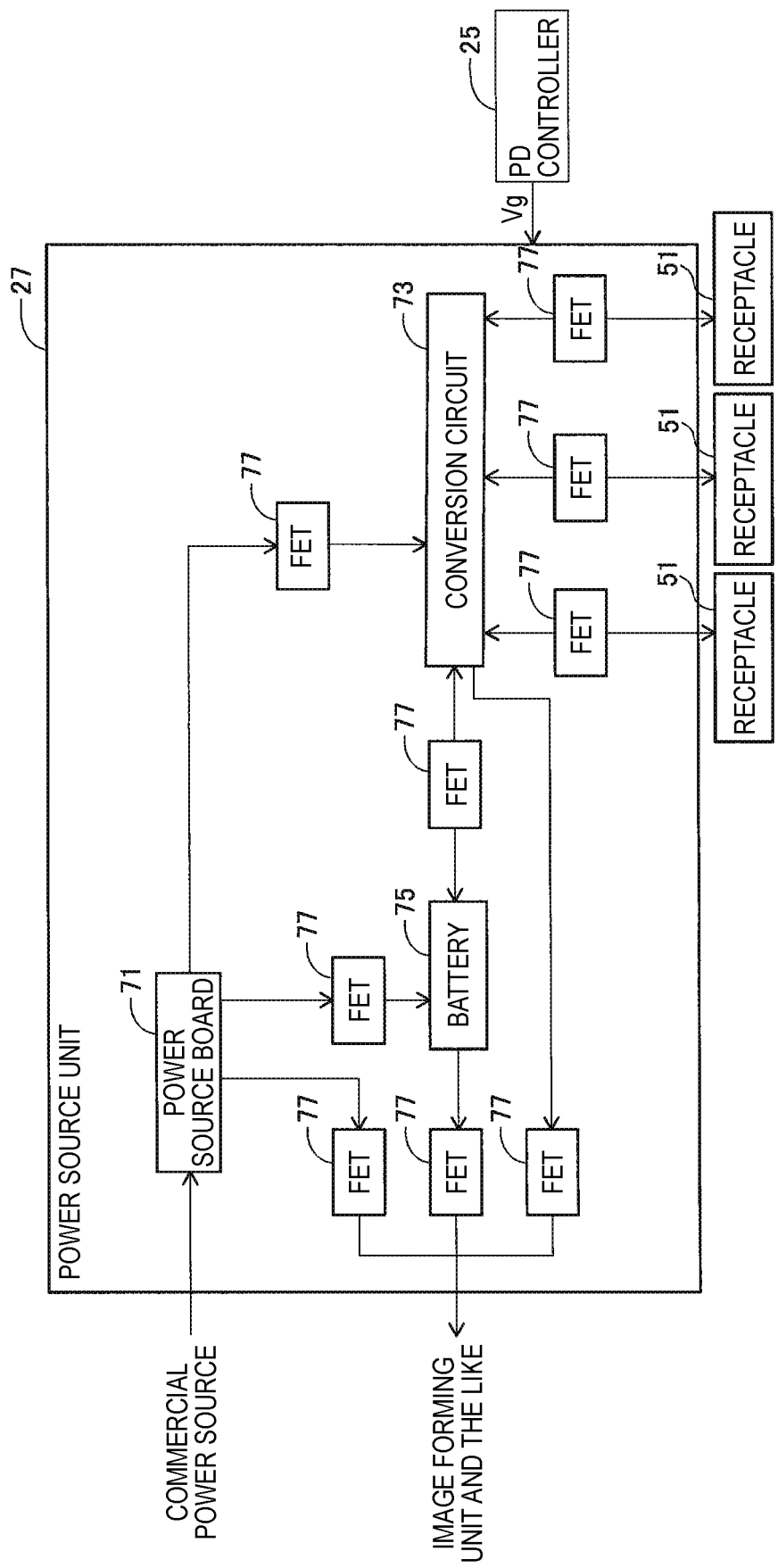
FIG. 3 is a block diagram illustrating a circuit configuration related to power transmission/reception of the printer.

Next, the configuration of the power source unit 27 will be described with reference to FIG. 3. As illustrated in FIG. 3, the power source unit 27 includes a power source board 71, a conversion circuit 73, the battery 75, and the like. The power source unit 27 includes an FET 77 that switches the connection between the power source board 71 and the like, and the connection between the power source board 71 and the receptacles 51. The FET 77 is a field effect transistor and switches connection according to a gate voltage Vg supplied from the PD controller 25. The switch for switching the connection is not limited to the FET but may be an IGBT. The switch for switching the connection is not limited to a semiconductor switch and may be a relay or the like.

The power source board 71 includes a power cable and a power source circuit (a bridge diode, a smoothing circuit, and the like) and converts an AC voltage supplied from a commercial power source into a DC voltage. The power source board 71 is connected to each of the conversion circuit 73 and the battery 75 via the FET 77. The conversion circuit 73 is a DC/DC converter, for example, and transforms an input DC voltage to generate DC voltages having different voltage values. The conversion circuit 73 is connected to the battery 75 and each of the three receptacles 51 via the FET 77. The conversion circuit 73 changes the amount of power supplied from each receptacle 51 based on the control of the CPU 12, for example.

The battery 75 is configured to be charged with electric power supplied from the power source board 71 or the conversion circuit 73. Each of the power source board 71, the conversion circuit 73, and the battery 75 is connected to each apparatus (image forming unit 16 and the like) of the printer 1 via the FET 77. Therefore, the printer 1 of the present embodiment is drivable by the power received from the commercial power source via the power source board 71. The printer 1 is drivable by the power supplied from the battery 75 and it is possible to carry and use the printer in various places. The printer 1 is configured to transform the power received via the USB connection unit 19 (receptacle 51) by the conversion circuit 73 and supply the transformed power to the image forming unit 16 and the like.

For example, the PD controller 25 outputs the gate voltage Vg and switches the FET 77 on and off based on the control of the CPU 12, thereby supplying power from the power source board 71 and the conversion circuit 73 to each apparatus of the printer 1. The PD controller 25 supplies the charging power to the battery 75 from the power source board 71 and the conversion circuit 73 by switching the FET 77. The receptacle 51 that functions as a power source supplies power to an external device. The PD controller 25 switches the FET 77 to transform the power received from the power source board 71, the battery 75, and other external devices connected to the USB connection unit 19 with the conversion circuit 73 and supplies the transformed power to an external device via the receptacle 51 that functions as a power source. The device that controls the FET 77 is not limited to the PD controller 25 but may be the CPU 12.

(3. Power Control)

Figure 4:
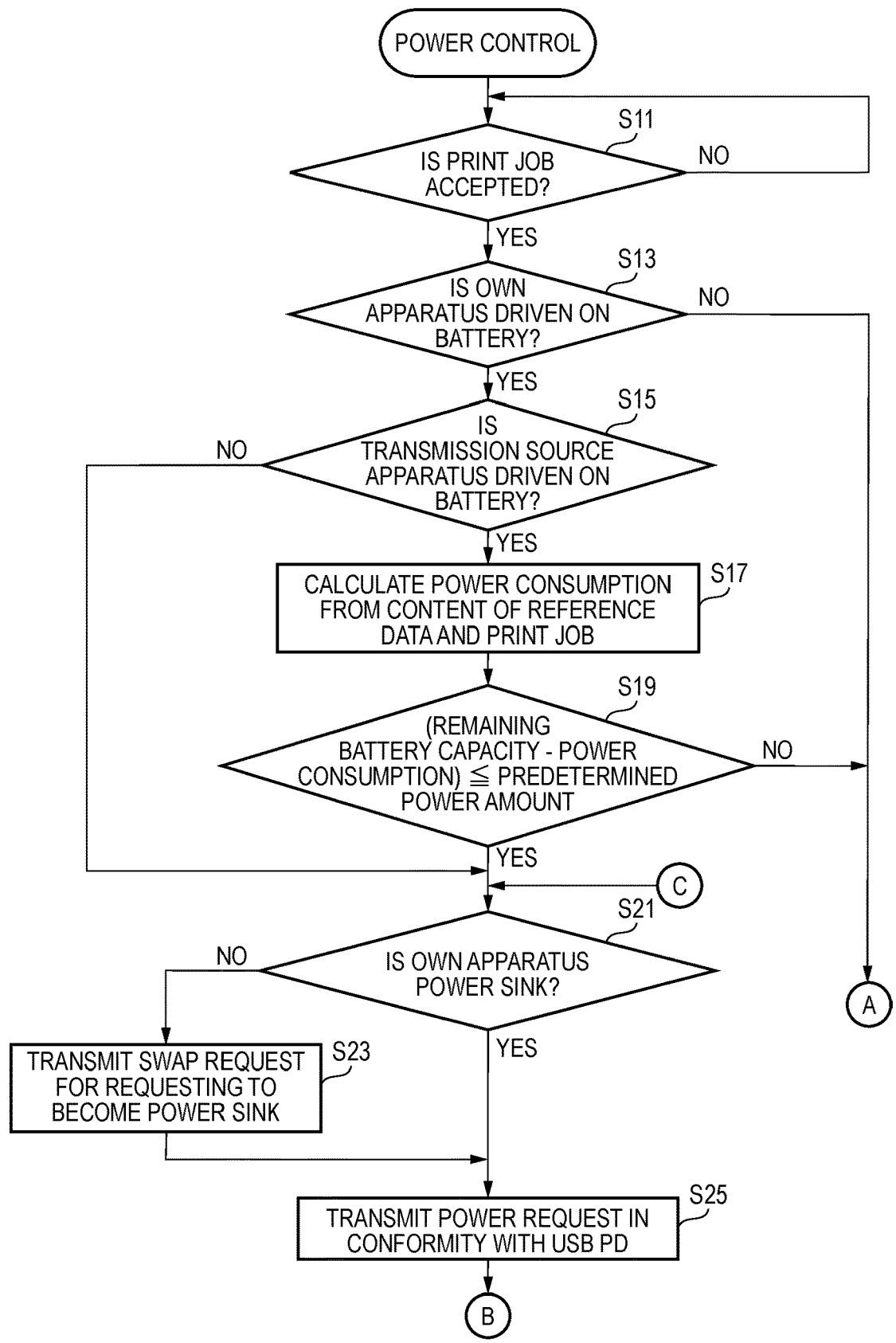
FIG. 4 is a flowchart illustrating contents of power control.

Next, control of power delivering of the USB connection unit 19 by the printer 1 of the present embodiment will be described with reference to FIGS. 4 and 5. For example, when the printer 1 is powered on, the CPU 12 executes the control program 41 stored in the ROM 14, starts the system of the printer 1, and then starts the power control illustrated in FIGS. 4 and 5. In the following description, the CPU 12 that executes the control program 41 may be simply described as the CPU 12. For example, the description "CPU 12 is" may mean "CPU 12 that executes the control program 41 is". The flowchart of the present specification basically shows the processing of the CPU 12 in accordance with instructions described in the program. That is, processing such as "receiving", "determining", "transmitting", and "calculating" in the following description represent processing of the CPU 12. The processing by the CPU 12 includes hardware control. The power control illustrated in FIGS. 4 and 5 may be executed by an apparatus other than the CPU 12. For example, the PD controller 25 may execute the power control illustrated in FIGS. 4 and 5 by executing the program PG.

Figures 6, 7:
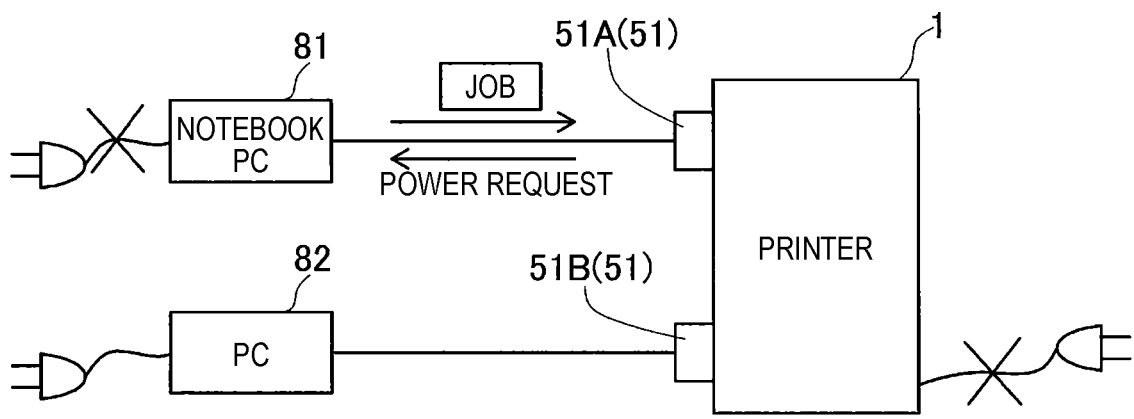
FIG. 6 is a diagram illustrating a configuration of a USB connection of the printer.
FIG. 7 is a diagram illustrating contents of reference data.

FIG. 6 illustrates an example of the USB connection configuration of the printer 1. In the following description, the connection configuration in FIG. 6 will be described as an example. As illustrated in FIG. 6, for example, notebook PC 81 and PC 82 are connected to each of two receptacles 51 of the printer 1. In the following description, when the receptacle 51 connected to the notebook PC 81 and the receptacle 51 connected to the PC 82 are described separately, the receptacle 51 will be referred to as receptacles 51A and 51B. In the case where the receptacle 51 is not described separately, it will be referred to as the receptacle 51.

First, in step (hereinafter, simply referred to as "S") 11 in FIG. 4, the CPU 12 of the printer 1 determines whether a print job has been accepted. Here, the printer 1 consumes power by executing a print job. As will be described later, when the printer 1 is driven by the battery 75, the printer 1 may run out of electric power in the battery during execution of the print job. Therefore, when receiving a print job, the CPU 12 according to the present embodiment secures electric power based on the power consumption required to execute the print job.

The CPU 12 repeatedly executes S11 while a print job is not accepted in S11 (S11: NO). Therefore, the CPU 12 accepts a print job and repeatedly executes the determination processing of S11 until a situation where power consumption is expected.

For example, as illustrated in FIG. 6, the printer 1 receives a print job JOB from the notebook PC 81 via the receptacle 51A. When receiving the print job JOB, the CPU 12 determines that the print job JOB has been accepted (S11: YES), and executes the processing after S13.

The condition for starting S13 and after are not limited to the condition for receiving the print job JOB. For example, when a job instructing an operation check such as a check for disconnection of the heating element of the thermal head 47 is received, the printer 1 consumes power along with the check operation. Alternatively, when the printer 1 has a scan function, a copy function, a FAX function, and the like, when receiving a job for executing each function, the printer 1 consumes power as the function is executed. Even in such a case, the CPU 12 may execute control for securing power based on the power consumption, as will be described later.

In S13, the CPU 12 determines whether the own apparatus is operating on the battery 75. For example, as illustrated in FIG. 6, when the printer 1 is not connected to a commercial power source, the CPU 12 determines that the own apparatus is operating on the battery 75 (S13: YES). Alternatively, even when the CPU 12 is receiving power from an external device via the USB connection unit 19, in a state in which the minimum amount of power that can be received (for example, 2.5 W) is being received and the printer 1 is not connected to a commercial power source, the CPU 12 determines that the apparatus is operating on the battery 75 (S13: YES).

That is, when the CPU 12 is driven by the power of the battery 75 in S13 and it is predicted that the power will be short by executing the print job JOB, the CPU 12 determines that the own apparatus is operating on the battery 75. If the CPU 12 makes a positive determination in S13 (S13: YES), the CPU 12 executes S15.

On the other hand, for example, when the printer 1 is connected to a commercial power source, the CPU 12 determines that the own apparatus is not operating on the battery 75 (S13: NO), and executes S45 of FIG. 5. When connected to a commercial power source, the printer 1 is securing power required to execute the print job JOB. Therefore, the CPU 12 starts executing the print job JOB accepted in S11 in S45. The CPU 12 performs printing by the image forming unit 16 based on the contents of the print job JOB. When the printing is completed, the CPU 12 ends the power control illustrated in FIGS. 4 and 5 and starts the processing from S11 again. As a result, the CPU 12 is ready to accept a next print job JOB.

In S15, the CPU 12 determines whether the apparatus that is a transmission source of the print job JOB is operating on a battery. The method for identifying the transmission source apparatus is not limited. For example, the CPU 12 may identify the notebook PC 81 connected to the receptacle 51A as the transmission source apparatus by detecting the receptacle 51A that has received the print job JOB. As described above, the printer 1 according to the present embodiment may accept a print job JOB from an external device via the communication interface 24 by wired LAN or wireless communication. For example, it is considered a case where a print job JOB is received from the notebook PC 81 connected to the receptacle 51A via a wired LAN (communication interface 24). Here, for example, when the printer driver operating on the notebook PC 81 transmits the print job JOB to the printer 1, vendor ID or product ID of the notebook PC 81 may be transmitted to the printer 1. The vendor ID and product ID information may be transmitted and received by communication conforming to the USB PD standard. Therefore, the CPU 12 may identify the apparatus that is the transmission source of the print job JOB by comparing the vendor ID received together with the print job JOB with the vendor ID acquired via the receptacle 51.

The method for determining whether the transmission source apparatus is operating on a battery is not limited. For example, the CPU 12 may determine whether the notebook PC 81 is operating on a battery by transmitting a message (such as Get_Source_Cap message) defined in the USB PD standard to the notebook PC 81 that is the transmission source and acquiring a message (Source_Capabilities and the like) indicating the power capability. For example, the Source_Capabilities message includes information such as whether an external power source (commercial power source or the like) is connected and whether a battery is present. The CPU 12 executes the determination of S15 based on the information.

For example, if the notebook PC 81 is not connected to a commercial power source and has a battery, the CPU 12 determines that the notebook PC 81 is operating on the battery (S15: YES), and executes S17. In S17, the CPU 12 calculates the power consumption (an example of the execution power) from the reference data 43 and the contents of the print job JOB.

FIG. 7 illustrates the contents of the reference data 43. In the reference data 43, the type of printing and an expression for calculating the power consumption are associated with each other and stored. The CPU 12 determines the type of printing based on the contents of the print job JOB and calculates the power consumption by using the corresponding calculation expression. The power consumption required to execute the print job JOB increases as the number of printed sheets increases. Therefore, for example, when the print setting of the print job JOB is monochrome printing, as illustrated in FIG. 7, the CPU 12 calculates the power consumption required to execute the print job JOB by multiplying the power consumption per sheet by the number of sheets to be printed. The power consumption per sheet is, for example, 0.1 Wh.

In color printing, for example, the processing load on the CPU 12 and the image forming unit 16 increases and power consumption increases as compared with monochrome printing. Therefore, as illustrated in FIG. 7, when the print setting of the print job JOB is color printing, the CPU 12 calculates the power consumption required to execute the print job JOB by quadrupling the power consumption of monochrome printing according to the calculation expression of the reference data 43.

Similarly, high-resolution printing increases processing load and power consumption compared to low-resolution printing. Therefore, when the print setting of the print job JOB is high-resolution printing, the CPU 12 calculates the power consumption required for execution of the print job JOB by doubling the power consumption for monochrome printing according to the calculation expression of the reference data 43.

The contents of the reference data 43 illustrated in FIG. 7 are an example. For example, in the case of color printing and high-resolution printing, the CPU 12 may calculate the power consumption by multiplying the power consumption of monochrome printing by eight times. For color printing, a different arithmetic expression for each number of colors may be set in the reference data 43. The resolution height may be divided in stages, and different arithmetic expressions may be set in the reference data 43 for each resolution. As a result, the CPU 12 may use different arithmetic expressions according to the number of colors and the resolution. In addition to monochrome printing, color printing, and high-resolution printing, the expression for calculating the power consumption may be changed depending on, for example, the presence of double-sided printing.

After calculating the power consumption in S17, the CPU 12 executes S19. In S19, the CPU 12 determines whether a value obtained by subtracting the power consumption calculated in S17 from the remaining battery capacity of the battery 75 is equal to or less than a predetermined power amount. If the remaining battery capacity is lower than the power consumption, it is determined that the printer 1 runs out of power during execution of the print job JOB. Therefore, the CPU 12 determines whether the power necessary for execution of the print job JOB remains in the battery 75 by comparing the remaining battery capacity and the power consumption. The value of the predetermined power amount used for the determination in S19 is not limited. For example, the power amount that should be left after the execution of the print job JOB may be set. When a value of zero is set as the predetermined power amount, the CPU 12 runs out of power when the print job JOB is completed. In other words, the CPU 12 executes the print job JOB even when the remaining battery capacity is exhausted. As a method for detecting the remaining battery capacity, a known technique based on the voltage value of the battery 75 or the like may be used.

In S19, if the CPU 12 makes a negative determination (S19: NO), that is, if there is sufficient power required to execute the print job JOB, the CPU 12 starts executing the print job JOB (S45 in FIG. 5). On the other hand, if the CPU 12 makes a positive determination in S19 (S19: YES), the CPU 12 executes S21. Here, because it is predicted that power will be short during execution of the print job JOB, before executing the print job JOB, the processing after S21 is executed to request power from the notebook PC 81. The CPU 12 once suspends the execution of the print job JOB.

Therefore, when the printer 1 of the present embodiment is battery-powered and the battery capacity is sufficient (S19: NO), the printer 1 executes printing with the power of the battery 75 of the own apparatus without executing the power request to the notebook PC 81 after S21. As a result, it is possible to prevent unnecessary requesting of power from the battery-driven notebook PC 81 and prevent the notebook PC 81 from running out of power during execution of the print job JOB.

In S15, if the notebook PC 81 is connected to an external power source such as a commercial power source, the CPU 12 makes a negative determination (S15: NO) and executes S21. Here, when the notebook PC 81 is connected to a commercial power source or the like, the power is sufficiently secured. Therefore, when the printer 1 requests the notebook PC 81 to provide power, the notebook PC 81 is likely to accept the request. Therefore, if the CPU 12 makes a negative determination in S15, the CPU 12 executes the processing after S21 without executing the processing in S17 and S19 and requests the notebook PC 81 for necessary power. The necessary power here is the power required to execute the print job JOB.

In S21, the CPU 12 determines whether the own power role is a power sink. The CPU 12 requests power from the notebook PC 81 that is the transmission source of the print job JOB in the processing after S25 described later. Therefore, the receptacle 51A connected to the notebook PC 81 needs to function as a power sink. On the other hand, as described above, when an external device is newly connected, the PD controller 25 randomly determines a power role with the external device. Thus, depending on the result determined at random, the receptacle 51A may function as a power source. Therefore, in S21, the CPU 12 determines whether the own apparatus is a power sink by determining whether the receptacle 51A functions as a power sink. When the CPU 12 is a power sink (S21: YES), the CPU 12 executes S25. Here, the CPU 12 omits the processing of switching to the power sink of S23.

On the other hand, when the CPU 12 determines that the own apparatus is not a power sink (S21: NO), the CPU 12 transmits a swap request for requesting to become a power sink to the notebook PC 81 (S23). Thereby, when receiving the consent to the swap request from the notebook PC 81, the CPU 12 cause the receptacle 51A to function as a power sink. After executing S21, the CPU 12 executes S25. The CPU 12 may notify an error when switching to the power sink fails.

In S25, the CPU 12 transmits a power request for requesting power to the notebook PC 81. The power amount requested here may be, for example, the maximum power amount that is suppliable from the notebook PC 81 when a negative determination is made in S15. That is, when the notebook PC 81 is connected to an external power source, the CPU 12 may request the notebook PC 81 for the maximum amount of power. When a positive determination is made in S15, it is preferable that the power requested in S25 is a value corresponding to the shortage of power determined in S19. That is, when the notebook PC 81 is also battery-powered, it is preferable that the CPU 12 requests the minimum power required to execute the print job JOB.

The CPU 12 controls the PD controller 25 to execute a negotiation for requesting power with the notebook PC 81. In the USB PD standard, for example, power is supplied in a power range of 2.5 W (5 V, 0.5 A) to 100 W (20 V. 5 A). The CPU 12 acquires a power list from the notebook PC 81 through USB PD communication. The power list here is information indicating a combination of a voltage value and a current value that is suppliable from the notebook PC 81 in the above power range. The CPU 12 refers to the power list, determines a combination of a voltage value and a current value to be requested, and executes a negotiation for requesting the notebook PC 81.

Figure 5:
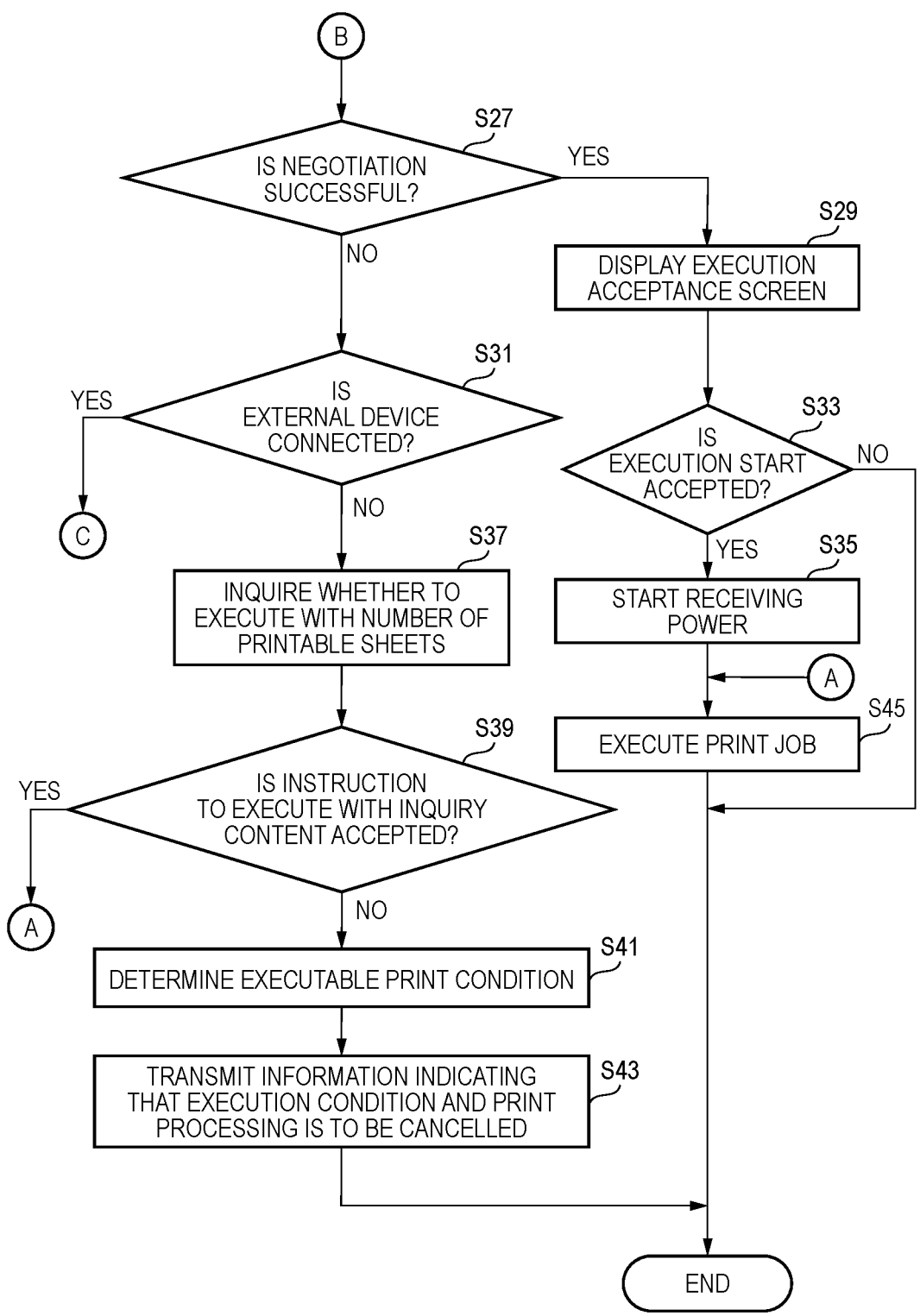
FIG. 5 is a flowchart illustrating the contents of power control.

When executing S25, the CPU 12 determines whether the negotiation for requesting power executed in S25 is successful (S27 in FIG. 5). When receiving the consent from the notebook PC 81 after transmitting the power request, the CPU 12 determines that the negotiation is successful (S27: YES), and executes S29. On the other hand, if the CPU 12 does not receive the consent from the notebook PC 81, the CPU 12 determines that the negotiation has failed (S27: NO), and executes S31.

Figure 8:
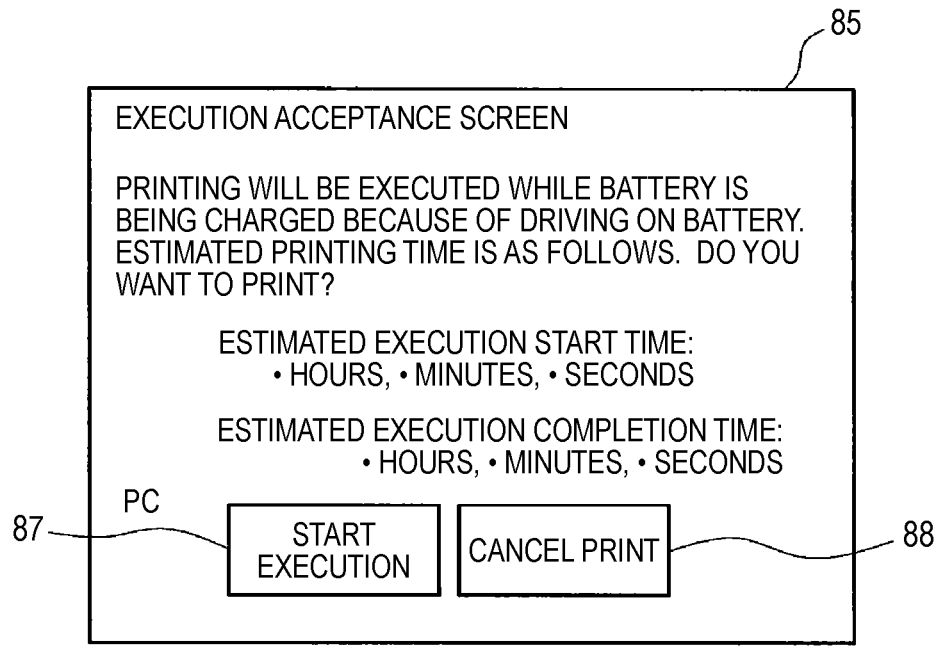
FIG. 8 is a diagram illustrating an execution acceptance screen.

In S29, the CPU 12 causes the notebook PC 81 to display an execution acceptance screen for receiving an instruction to start execution of the print job JOB. FIG. 8 illustrates an execution acceptance screen 85. For example, the CPU 12 transmits an instruction to the printer driver executed on the notebook PC 81 and displays the execution acceptance screen 85 on the screen of the notebook PC 81. When executing S29, the printer 1 executes the print job JOB while receiving power from the notebook PC 81. If the amount of power received from the notebook PC 81 and the remaining battery capacity are large, the CPU 12 is likely to be able to start printing immediately. On the other hand, when the amount of power received from the notebook PC 81 or the remaining battery capacity is low, the CPU 12 may not be able to start printing unless the battery 75 is charged for a certain period of time. If no notification is given even though the start of printing is delayed, a user operating the notebook PC 81 is simply in a state of waiting for the start of printing. When the amount of power received from the notebook PC 81 is small, the charging speed of the battery 75 is slow, and the time until printing is completed is long. As a result, the printing is not completed even if the estimated time of the user who has instructed printing is exceeded.

Therefore, as illustrated in FIG. 8, the CPU 12 displays on the execution acceptance screen 85 the estimated execution start time when printing is startable and the estimated execution completion time until printing is completed. The CPU 12 can calculate the estimated execution start time and the estimated execution completion time based on, for example, the remaining battery capacity, the amount of power received from the notebook PC 81, the power consumption required to execute, and the like. As illustrated in FIG. 8, the CPU 12 displays on the execution acceptance screen 85 that the printer 1 is battery-powered and that printing is executed while the battery 75 is being charged.

This allows the user who has instructed printing to know the power status of the printer 1 and the scheduled printing time.

The CPU 12 displays an execution start button 87 for receiving the start of printing and a print cancel button 88 for canceling the printing on the execution acceptance screen 85. The CPU 12 determines whether the execution start is accepted in S33 after executing S29. When receiving information indicating that the execution start button 87 on the execution acceptance screen 85 has been operated, from the notebook PC 81, the CPU 12 determines that the execution start has been received (S33: YES), and executes S35. The CPU 12 controls the PD controller 25 to start receiving power from the notebook PC 81 (S35) and controls the image forming unit 16 to start printing (S45). Thereby, the execution of the print job JOB is completed while receiving power from the notebook PC 81 that is the transmission source of the print job JOB.

In S33, when receiving information indicating that the print cancel button 88 on the execution acceptance screen 85 has been operated, from the notebook PC 81, the CPU 12 makes a negative determination (S33: NO). Here, the CPU 12 cancels the printing without executing, discards the print job JOB, and ends the power control illustrated in FIGS. 4 and 5. Thus, when the user who sees the estimated execution start time or the estimated execution completion time displayed on the execution acceptance screen 85 wants to cancel printing, the user operates the print cancel button 88 to cancel printing. For example, if the estimated execution start time or the like is later than the allowable time, the user executes an appropriate response such as temporarily cancelling printing and printing after connecting the printer 1 to a commercial power source.

On the other hand, if the negotiation with the notebook PC 81 fails (S27: NO), the printer 1 cannot secure power. Therefore, in S31, the CPU 12 determines whether an external device other than the notebook PC 81 is connected to the USB connection unit 19. That is, the CPU 12 searches for a power source other than the notebook PC 81.

In the example illustrated in FIG. 6, in addition to the notebook PC 81, the PC 82 is connected to the receptacle 51B. Here, the CPU 12 makes a positive determination in S31 (S31: YES) and executes the processing after S21 in FIG. 4. The CPU 12 sets the own apparatus as a power sink with respect to the PC 82 (S21, S23) and transmits a power request to the PC 82 (S25). If the CPU 12 receives the desired power from the PC 82 (S27: YES), the CPU 12 executes processing after S29, and if not (S27: NO), the CPU 12 searches for an external device other than the notebook PC 81 and the PC 82 (S31). Thus, the CPU 12 searches for an external device serving as a power source and secures power. For example, as illustrated in FIG. 6, if the PC 82 is connected to a commercial power source, the printer 1 is more likely to be able to receive power from the PC 82. Accordingly, even when power cannot be received from the notebook PC 81 that is the transmission source of the print job JOB, the print job JOB is executed.

When the CPU 12 makes a negative determination in S31 (S31: NO), the CPU 12 inquires whether to execute with the number of printable sheets (S37). The number of printable sheets is, for example, the number of sheets that can be printed only with the current remaining battery capacity among the number of sheets to be printed which is set in the print job JOB. The power consumption for executing the print job JOB is reduced by reducing the number of sheets to be printed. Therefore, in S37, the CPU 12 calculates the number of sheets that can be printed with the remaining battery power. For example, based on the reference data 43 and the remaining battery capacity, the CPU 12 calculates the maximum number of sheets that is printable with the remaining battery capacity.

Figure 9:
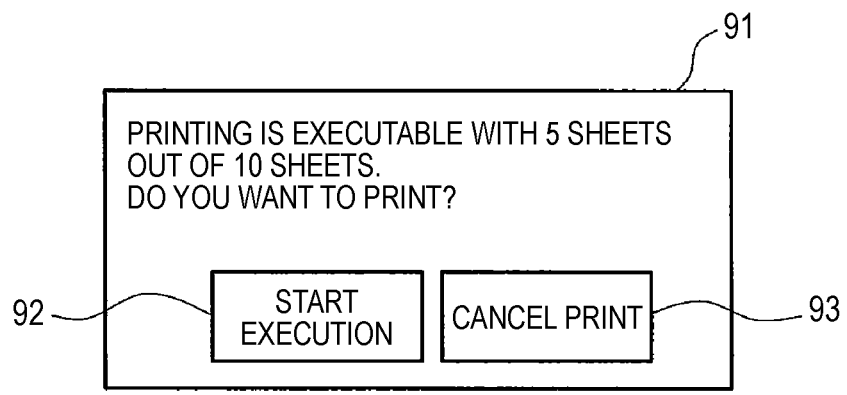
FIG. 9 is a diagram illustrating a screen displayed at a transmission source of a print job.

The CPU 12 transmits information on the calculated number of sheets to be printed to the notebook PC 81 and displays the information on the notebook PC 81 to inquire about partial execution of the print job JOB (S37). FIG. 9 illustrates an example of a screen 91 that the CPU 12 displays on the notebook PC 81 in S37. For example, the CPU 12 displays on the screen 91 that printing is executable with only a part of the number of sheets (for example, five) out of the number of sheets to be printed (for example, ten) set in the print job JOB. The CPU 12 displays an execution start button 92 and a print cancel button 93 on the screen 91 in the same manner as the execution acceptance screen 85 illustrated in FIG. 8.

In S39 following S37, the CPU 12 determines whether an instruction to execute with the inquiry content has been received. When the execution start button 92 is operated on the screen 91, the CPU 12 determines that the execution start has been accepted (S39: YES) and prints the accepted number of sheets to be printed (for example, 5) (S45). Thereby, printing is executable as much as possible with the current remaining battery capacity.

If the print stop button 93 is operated on the screen 91, the CPU 12 makes a negative determination in S39 (S39: NO) and executes S41. In S41, the CPU 12 determines an executable printing condition. The power consumption of the print job JOB varies depending not only on the number of sheets to be printed but also on the printing resolution and the number of colors. Therefore, for example, in S41, the CPU 12 determines under what printing condition the print job JOB is executable without reducing the number of sheets to be printed. The CPU 12 transmits to the notebook PC 81 the determined printing condition and information to cancel the printing and displays the condition and information on the notebook PC 81 (S43). When executing S43, the CPU 12 ends the power control illustrated in FIGS. 4 and 5. The CPU 12 starts the processing from S11.

Figure 10:
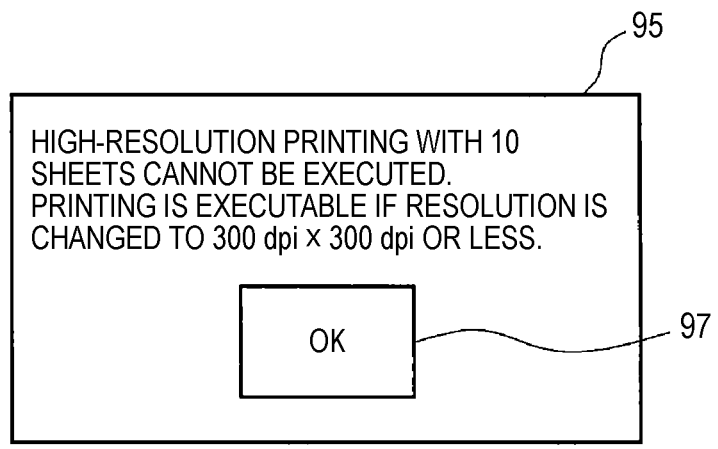
FIG. 10 is a diagram illustrating a screen displayed at the transmission source of the print job.

FIG. 10 illustrates an example of a screen 95 displayed on the notebook PC 81 in S43. For example, the CPU 12 displays on the screen 95 that printing cannot be executed with the setting of the accepted print job JOB (high resolution and 10 sheets in the illustrated example). The CPU 12 displays on the screen 95 the printing condition determined in S41 (for example, how far resolution is reducible to perform printing). For example, the reference data 43 may be set with an arithmetic expression of power consumption corresponding to the resolution. In S41, the CPU 12 refers to the reference data 43 to determine how far the resolution is reducible so that printing is completed with the current remaining battery capacity without reducing the number of sheets to be printed. The CPU 12 determines a printing condition based on the determination result and displays the determined printing condition (resolution) on the screen 95 (S43). As illustrated in FIG. 10, for example, the CPU 12 displays on the screen 91 that printing may be performed without reducing the number of sheets to be printed if the resolution is changed to 300 dpi*300 dpi or less. Therefore, this resolution (300 dpi*300 dpi) is the resolution (printing condition) lowered according to the amount of power that is short to execute the print job JOB. The CPU 12 displays an OK button 97 on the screen 95. When the OK button 97 is operated, the CPU 12 instructs the notebook PC 81 to end the display of the screen 95. As a result, it is possible to notify under what printing condition printing can be executed. After confirming the contents of the screen 95, the user can erase the screen 95 by operating the OK button 97 and newly issue a print instruction with reduced resolution. Thereby, it is possible to cause the user to perform appropriate printing according to the remaining battery capacity.

The printer 1 is an example of an information processing apparatus. The CPU 12 is an example of a controller. The image forming unit 16 is an example of a processing unit. The TX pin, the RX pin, and the D pin of the receptacle 51 illustrated in FIG. 2 are examples of the first communication interface, the first communication line, the second communication interface, and the second communication line. The CC pin is an example of a second communication interface and a second communication line. The notebook PC 81 is an example of an external device. The print job JOB is an example of a job. S25 is an example of first transmission processing.

(4. Effect)

As described above, according to above-described embodiment, there exist the following effects. (1) The receptacle 51 of the USB connection unit 19 of the printer 1 of the present embodiment includes the TX pin, the RX pin, and the D pin that perform communication related to acceptance of the print job JOB, and the TX pin and the RX pin, the D pin, and the CC pin that perform communication related to power delivering. In response to receiving the print job JOB transmitted from the notebook PC 81 via the TX pin or the like (S11: YES), the CPU 12 transmits a power request via the TX pin or the like to the notebook PC 81 that has transmitted the print job JOB (S25, an example of the first transmission processing).

According to this, when receiving the print job JOB from the notebook PC 81, the CPU 12 transmits a power request to the notebook PC 81 that has transmitted the print job JOB. Thus, when a print job JOB is accepted, the print job JOB is processed while receiving necessary power from a transmission source external device and securing the power.

(2) The printer 1 further includes the battery 75. In response to receiving the print job JOB via the TX pin and the like, the CPU 12 executes S19 (an example of first determination processing) for determining whether S25 needs to be executed based on the remaining battery capacity that is the remaining capacity of the battery 75 and the power consumption (an example of the amount of execution power) that is the amount of power required to execute the print job JOB in the image forming unit 16. According to this, the CPU 12 appropriately determines the necessity of the power request based on the remaining battery capacity of the printer 1 and the power consumption required to execute the print job JOB.

(3) If the CPU 12 determines in S19 that the value obtained by subtracting the power consumption from the remaining battery capacity is equal to or less than the predetermined power amount (S19: YES), the CPU 12 executes S25. According to this, the CPU 12 appropriately determines the necessity of the power request based on the difference between the remaining battery capacity and the power consumption.

(4) If the CPU 12 determines that the notebook PC 81 has rejected the power request (S27: NO), the CPU 12 cancels (S43) or suspends the execution of the print job JOB by the image forming unit 16 (S31 and later). When the power request is rejected from the notebook PC 81, it is difficult for the CPU 12 to secure power. Therefore, it is possible to prevent the occurrence of a situation where the power is short and the operation is stopped during the execution of the print job JOB by canceling the execution of the accepted print job JOB. By holding the execution of the print job JOB, it is possible to secure power and change the execution condition of the print job JOB during the hold.

(5) When the CPU 12 determines that the notebook PC 81 has rejected the power request (S27: NO), the CPU 12 executes S43 (an example of second transmission processing) for transmitting information indicating that the print job JOB cannot be executed, to the notebook PC 81 that has transmitted the print job JOB, via the TX pin or the like. According to this, when the power request is rejected and it becomes difficult to secure the power, the CPU 12 transmits to the notebook PC 81 that the print job JOB cannot be executed. Thus, it is possible to notify the user who has instructed execution of the print job JOB that the execution of the print job JOB has been cancelled.

(6) When the CPU 12 determines that the notebook PC 81 has rejected the power request (S27: NO), the CPU 12 executes S37 (an example of third transmission processing) for inquiring whether to partially execute the print job JOB. According to this, when the power request is rejected and it becomes difficult to secure the power, the CPU 12 inquires whether even a part (small number of sheets) of the received print job JOB should be executed. This allows the user to make an appropriate determination according to the necessity of executing the print job JOB.

(7) When the CPU 12 determines that the notebook PC 81 has rejected the power request (S27: NO), the CPU 12 executes S43 (an example of fourth transmission processing) for transmitting information indicating a change in the execution condition of the print job JOB. According to this, when the power request is rejected and it becomes difficult to secure the power, the CPU 12 transmits information (information that the resolution needs to be reduced) indicating a change in the execution condition of the received print job JOB. This allows the user to make an appropriate determination according to the necessity of executing the print job JOB.

(8) In S43, the CPU 12 transmits information on the execution condition changed according to the amount of power that is short to execute the print job JOB. According to this, the CPU 12 specifically informs under what execution condition (for example, a value with reduced resolution) printing is executed according to the amount of power that is short for the execution of the print job JOB.

(9) When the CPU 12 determines that the notebook PC 81 has rejected the power request (S27: NO), the CPU 12 executes S31 (an example of search processing) for searching for an external device that can supply power in addition to the notebook PC 81 that has transmitted the print job JOB. According to this, when the power request is rejected, the CPU 12 searches for another external device in order to secure a shortage of power. As a result, it is possible to receive power from other external devices to secure the power and appropriately execute the print job JOB.

(10) When the CPU 12 determines that the notebook PC 81 has approved the power request (S27: YES), the CPU 12 executes S29 (an example of fifth transmission processing) for transmitting information indicating the time required to execute the print job JOB to the notebook PC 81 based on the amount of power received from the notebook PC 81 that has transmitted the print job JOB (see FIG. 8).

According to this, when the power request is approved and the power is secured, the CPU 12 executes the print job JOB while receiving necessary power from the notebook PC 81. Here, since the print job JOB is executed while receiving power, the execution time of the print job JOB may become longer depending on the amount of power received. Therefore, the CPU 12 transmits information on the time required to execute the print job JOB (expected execution start time and expected execution completion time) to the notebook PC 81. This allows the user to recognize the time required to execute the print job JOB.

(11) The receptacle 51 of the USB connection unit 19 is a universal serial bus (USB) interface including the TX pin or the like (an example of the first communication line) for performing data communication and the CC pin or the like (an example of the second communication line) for performing communication related to power delivering. The receptacle 51 having such a configuration may execute communication related to the print job JOB and communication related to power delivering with one USB interface. The printer 1 may accept the print job JOB through communication via the communication interface 24 (wired communication via LAN or the like) and execute communication related to power delivering via the USB connection unit 19. That is, the first communication interface (first communication line) and the second communication interface (second communication line) may be separate interfaces.

(12) The receptacle 51 of the USB connection unit 19 includes the D pin (D+/D− pin) (an example of the first communication line) and the CC pin (an example of the second communication line) defined by the USB standard. The receptacle 51 having such a configuration may execute, for example, communication related to the print job JOB using the D pin and communication related to power delivering using the CC pin.

(5. Modification Example)

Needless to say, the present application is not limited to the above-described embodiment, and various modifications and changes may be made without departing from the spirit of the present disclosure. For example, the processing content and the processing order in the power control illustrated in FIGS. 4 and 5 are examples. For example, the CPU 12 may execute the processing for switching to the power sink of S21 and S23 between S13 and S15. In S37, the CPU 12 determines a condition for partially executing the print job JOB by reducing the number of sheets to be printed, but the present invention is not limited thereto. The CPU 12 may determine a condition under which the print job JOB may be partially executed by reducing the resolution or the number of colors. That is, the partial execution of the job of the present application is a concept including various execution modes in which the amount of execution power required to execute the job may be reduced. The CPU 12 may display a plurality of executable printing conditions (condition for partial execution) in a selectable state on the screen 91 in FIG. 9. Similarly, the CPU 12 may display, on the screen 95 in FIG. 10, a printing condition for reducing the number of colors and a printing condition for reducing both the resolution and the number of colors in addition to the resolution. The printer 1 may be configured to execute only one of the two types of processing of the inquiry about the partial execution of the print job JOB in S37 and the notification of the executable print conditions in S43.

In S19, the CPU 12 compares the value obtained by subtracting the power consumption from the remaining battery capacity with the predetermined power amount, but may compare the remaining battery capacity with the power consumption, for example. For example, when the remaining battery capacity is less than the power consumption (S19: YES), the CPU 12 may execute the processing after S21.

Therefore, if the CPU 12 determines whether the remaining battery capacity is smaller than the power consumption (an example of the amount of execution power) in S19 and determines that the remaining battery capacity is smaller than the power consumption, the CPU 12 may determine that it is necessary to execute S25 (an example of the first transmission processing). According to this, the CPU 12 appropriately determines the necessity of a power request by comparing the magnitude relationship between the remaining battery capacity and the power consumption.

The CPU 12 may not execute processing based on the power consumption of S19. For example, the CPU 12 may transmit a power request when the own apparatus is battery-powered (S13: YES) and the external device that is the transmission source of the print job JOB is connected to a commercial power source (S15: YES). If the negotiation fails in S27, the CPU 12 may determine to cancel the print job JOB immediately without executing S31 or the like. The CPU 12 does not have to execute display processing such as the estimated execution start time of S29.

For example, in the above embodiment, the control illustrated in FIGS. 2 to 5 is executed by the CPU 12 but may executed by other apparatuses. For example, the PD controller 25 may execute the power control illustrated in FIGS. 4 and 5 by executing the program PG in the memory 26. Here, the PD controller 25 is an example of a controller of the present disclosure. The program PG is an example of the program of the present disclosure. The storage unit that stores the reference data 43 may not be provided in the printer 1. For example, the CPU 12 may store the reference data 43 in an external device such as a server. The communication standard of the second communication interface in the present application is not limited to the USB PD standard and may be another communication standard capable of delivering electric power.

In the above embodiment, the CPU 12 is employed as the controller of the present application, but the present invention is not limited thereto. For example, the controller may be configured with dedicated hardware such as an application specific integrated circuit (ASIC). The controller may be configured to operate by using, for example, software processing and hardware processing together. In the above embodiment, the portable printer 1 is employed as the information processing apparatus of the present application, but is not limited thereto. The information processing apparatus of the present application may be a non-portable stationary printer and is not limited to a printer, and may be a copying apparatus, a fax apparatus, or a scanner apparatus. The information processing apparatus of the present application may be a multi function device having a plurality of functions. Therefore, the job of the present application is not limited to the print job JOB, but may be a job instructing copying, faxing, scanning, or the like. The processing unit is not limited to the image forming unit 16 and may be a fax processing unit or a scan processing unit.

What is claimed is:

1. An information processing apparatus comprising:
   a first communication interface for receiving a job;
   a second communication interface for negotiating delivery of electric power;
   a processing unit that performs processing related to the job; and
   a controller that is configured to
   in response to accepting the job received from an external device via the first communication interface,
      determine whether the information processing apparatus is operating as a power sink;
      transmit a swap request to become the power sink to the external device if the information processing apparatus is not operating as the power sink; and transmit a power request to the external device via the second communication interface and perform information processing by using electric power supplied from the external device,
wherein the job is one of a print, fax, copy and scan job.

2. The information processing apparatus according to claim 1 further comprising:
a battery, wherein
in response to accepting the job via the first communication interface, the controller is further configured to determine whether the transmission of the power request needs to be executed based on a remaining battery capacity that is a remaining capacity of the battery and an amount of execution power that is an amount of electric power required to execute the job in the processing unit.

3. The information processing apparatus according to claim 2, wherein
the controller is further configured to determine whether a value obtained by subtracting the amount of execution power from the remaining battery capacity is equal to or less than a predetermined power amount in the determination whether the transmission of the power request needs to be executed, and
when the value obtained by subtracting the amount of execution power from the remaining battery capacity is equal to or less than the predetermined power amount in the determination whether the transmission of the power request needs to be executed, the controller is further configured to determine that the transmission of the power request needs to be executed.

4. The information processing apparatus according to claim 2, wherein
the controller is further configured to determine whether the remaining battery capacity is smaller than the amount of execution power in the determination whether the transmission of the power request needs to be executed, and
when the controller determines that the remaining battery capacity is smaller than the amount of execution power in the determination whether the transmission of the power request needs to be executed, the controller is further configured to determine that the transmission of the power request needs to be executed.

5. The information processing apparatus according to claim 1 wherein
when the controller determines that the external device has rejected the power request, the controller is further configured to cancel or suspend execution of the job in the processing unit.

6. The information processing apparatus according to claim 1, wherein
when the controller determines that the external device has rejected the power request, the controller is further configured to transmit information indicating that the job cannot be executed to the external device that has transmitted the job, via the first communication interface.

7. The information processing apparatus according to claim 1, wherein
when the controller determines that the external device has rejected the power request, the controller is further configured to inquire whether to partially execute the job to the external device that has transmitted the job, via the first communication interface.

8. The information processing apparatus according to claim 1, wherein
when the controller determines that the external device has rejected the power request, the controller is further configured to transmit information indicating a change in an execution condition of the job to the external device that has transmitted the job, via the first communication interface.

9. The information processing apparatus according to claim 8, wherein
in the transmission of the information indicating the change in the execution condition of the job to the external device, the controller is further configured to transmit information on the execution condition changed according to a shortage amount of power for executing the job.

10. The information processing apparatus according to claim 1 wherein
when the controller determines that the external device has rejected the power request, the controller is further configured to search for an external device capable of supplying power other than the external device that has transmitted the job.

11. The information processing apparatus according to claim 1, wherein
when the controller determines that the external device has approved the power request, the controller is further configured to transmit information indicating a time required to execute the job to the external device that has transmitted the job based on an amount of electrical power received from the external device that has transmitted the job.

12. The information processing apparatus according to claim 1, further comprising:
a universal serial bus (USB) interface having a first communication line for performing data communication and a second communication line for delivering the electric power, wherein
the first communication interface includes the first communication line, and
the second communication interface includes the second communication line.

13. The information processing apparatus according to claim 12, wherein
the first communication line includes D+/D− pins defined in the universal serial bus (USB) standard, and
the second communication line includes a CC pin.

14. A control method of an information processing apparatus including a first communication interface for receiving a job, a second communication interface for negotiating delivery of electric power, and a processing unit that performs processing related to the job, the method comprising:
in response to accepting the job received from an external device via the first communication interface,
determining whether the information processing apparatus is operating as a power sink;
transmitting a swap request to become the power sink to the external device if the information processing apparatus is not operating as the power sink; and
transmitting a power request to the external device via the second communication interface and performing information processing by using electric power supplied from the external device,
wherein the job is one of a print, fax, copy and scan job.

15. The control method according to claim 14, wherein the information processing apparatus further includes:
   a battery, wherein
   the method further comprises, in response to accepting the job via the first communication interface, determining whether the transmission of the power request needs to be executed based on a remaining battery capacity that is a remaining capacity of the battery and an amount of execution power that is an amount of electric power required to execute the job in the processing unit.

16. The control method according to claim 15, further comprising:
   determining whether a value obtained by subtracting the amount of execution power from the remaining battery capacity is equal to or less than a predetermined power amount in the determination whether the transmission of the power request needs to be executed, and
   when the value obtained by subtracting the amount of execution power from the remaining battery capacity is equal to or less than the predetermined power amount in the determination whether the transmission of the power request needs to be executed, determining that the transmission of the power request needs to be executed.

17. The control method according to claim 15, further comprising:
   determining whether the remaining battery capacity is smaller than the amount of execution power in the determination whether the transmission of the power request needs to be executed, and
   when the controller determines that the remaining battery capacity is smaller than the amount of execution power in the determination whether the transmission of the power request needs to be executed, determining that the transmission of the power request needs to be executed.

18. The control method according to claim 14 further comprising:
   when the controller determines that the external device has rejected the power request, cancelling or suspending execution of the job in the processing unit.

19. The control method according to claim 14, further comprising:
   when the controller determines that the external device has rejected the power request, executing transmitting information indicating that the job cannot be executed to the external device that has transmitted the job, via the first communication interface.

20. A non-transitory computer readable medium storing a program causing a computer to execute a process for controlling an information processing apparatus including a first communication interface for receiving a job, a second communication interface for negotiating delivery of electric power, and a processing unit that performs processing related to the job, the process comprising:
   in response to accepting the job received from the external device via the first communication interface,
      determining whether the information processing apparatus is operating as a power sink;
      transmitting a swap request to become the power sink to the external device if the information processing apparatus is not operating as the power sink; and
      transmitting a power request to the external device via the second communication interface and performing information processing by using electric power supplied from the external device,
   wherein the job is one of a print, fax, copy and scan job.

* * * * *